(12) United States Patent
Sundar Pal et al.

(10) Patent No.: US 10,979,902 B2
(45) Date of Patent: Apr. 13, 2021

(54) METHOD AND SYSTEM FOR SECURING USER PLANE COMMUNICATION BETWEEN USER EQUIPMENTS AND EVOLVED NODEBS

(71) Applicant: WIPRO LIMITED, Bangalore (IN)

(72) Inventors: Shyam Sundar Pal, Kolkata (IN); Gopinath Das, Balasore (IN)

(73) Assignee: Wipro Limited, Bangalore (IN)

( * ) Notice: Subject to any disclaimer, the term of this patent is extended or adjusted under 35 U.S.C. 154(b) by 178 days.

(21) Appl. No.: 16/202,126

(22) Filed: Nov. 28, 2018

(65) Prior Publication Data
US 2020/0120496 A1      Apr. 16, 2020

(30) Foreign Application Priority Data

Oct. 15, 2018   (IN) .............................. 201841039115

(51) Int. Cl.
*H04W 12/04*      (2021.01)
*H04W 12/00*      (2021.01)
(Continued)

(52) U.S. Cl.
CPC ....... *H04W 12/0401* (2019.01); *H04L 9/0643* (2013.01); *H04L 9/0869* (2013.01);
(Continued)

(58) Field of Classification Search
CPC ....... H04W 12/0401; H04W 12/04031; H04W 12/0013; H04W 12/06; H04W 80/02;
(Continued)

(56) References Cited

U.S. PATENT DOCUMENTS 9,585,013 B2     2/2017   Mizikovsky et al.
2015/0223058 A1*  8/2015   Yang ................. H04W 12/0401
                                                         455/411

(Continued)

FOREIGN PATENT DOCUMENTS

EP          3163923 A1     5/2017

OTHER PUBLICATIONS

Extended European Search Report issued in the European Patent Office in counterpart European Application No. 19165641.2, dated Oct. 9, 2019, 5 pages.

*Primary Examiner* — Brandon S Hoffman
*Assistant Examiner* — Nega Woldemariam
(74) *Attorney, Agent, or Firm* — Finnegan, Henderson, Farabow, Garrett & Dunner, LLP

(57) ABSTRACT

The method of securing secure communication between a User Equipment (UE) and evolved NodeB (eNB), involves deriving a user plane (UP) encryption key ($K_{UPenc}$) from a shared key ($K_{eNB}$) associated with the UE for an ongoing communication session. At the UE, the UP encryption key ($K_{UPenc}$) may be hashed with a number of random numbers to generate a plurality UP encryption keys($K_{UPenc(n)}$), wherein the random numbers are transmitted to the eNB through a Packet Data Convergence Protocol (PDCP) control message. One or more data packets sent from the UE to the eNB may be encrypted, by the UE, using the plurality of UP encryption keys ($K_{UPenc(n)}$).

11 Claims, 7 Drawing Sheets

(51) Int. Cl.
- *H04L 9/06* (2006.01)
- *H04L 9/08* (2006.01)
- *H04W 12/06* (2021.01)
- *H04W 80/02* (2009.01)
- *H04W 80/08* (2009.01)

(52) U.S. Cl.
CPC . *H04W 12/0013* (2019.01); *H04W 12/04031* (2019.01); *H04W 12/06* (2013.01); *H04W 80/02* (2013.01); *H04W 80/08* (2013.01)

(58) Field of Classification Search
CPC .... H04W 80/08; H04W 12/04; H04L 9/0643; H04L 9/0869; H04L 63/0428; H04L 63/061
See application file for complete search history.

(56) References Cited

U.S. PATENT DOCUMENTS

| | | |
|---|---|---|
| 2016/0127897 A1 | 5/2016 | Lee et al. |
| 2018/0013568 A1* | 1/2018 | Muhanna ............... H04L 9/0825 |

\* cited by examiner

METHOD AND SYSTEM FOR SECURING USER PLANE COMMUNICATION BETWEEN USER EQUIPMENTS AND EVOLVED NODEBS

TECHNICAL FIELD

This disclosure relates generally to communication systems, and more particularly to a method and system for secure user plane communication between User Equipment (UEs) AND Evolved NodeBs (eNBs).

BACKGROUND

Wireless communication networks enable transmission and reception of information between mobile User Equipment (UEs) such as mobile communication devices, mobile phones, and wireless user terminals. Such communication networks may include a plurality of access points (e.g., base stations or eNB) which provide wireless communication links to the mobile UEs (e.g., mobile communication devices, mobile phones, wireless user terminals). The access points may be stationary (e.g., fixed to the ground) or mobile (e.g., mounted on satellites, etc.) and positioned to provide wide area coverage as the mobile UEs travel across different coverage areas.

In some communication systems, when a mobile UE attaches to a communication network through an access point (eNB), the mobile UE performs network access authentication to establish a secure master key ($K_{eNB}$). Using the secure master key ($K_{eNB}$), various subordinate keys such as encryption and integrity keys denoted as $K_{RRCenc}$, $K_{RRCint}$, $K_{UPenc}$, and $K_{UPin}$ may be generated in the UE for anchoring the control plane (CP) data and user plane (UP) data with the same access point (eNB). However, this approach creates a security risk if the access point is compromised since the subordinate keys become unsecured and can be used to compromise all communications in which that subordinate keys are used.

For example, if an unauthorized entity gets hold of these subordinate keys, then the security and integrity of the UP data (i.e. actual user data) is compromised. There are malicious entities or intruders who can intercept the air interface data and employ different methods (e.g., brute force through Man in the Middle (MitM) attack) to get the user plane keys. As all the UP data is encrypted by same key (i.e., $K_{UPenc}$), it is easy to use the brute force method to get the keys (i.e., $K_{UPenc}$). Once the keys are found then the entire session may be compromised and the UP data may be intercepted by the intruder. Consequently, a technique is needed that provides a secure communication between the UE and access points without compromising the security of UP communication.

SUMMARY

In one embodiment, a method of secure user plane communication between a User Equipment (UE) and evolved NodeB (eNB) is disclosed. The method may include deriving, by the UE, a user plane (UP) encryption key ($K_{UPenc}$) from a shared key ($K_{eNB}$) associated with the UE for an ongoing communication session. The UP encryption key ($K_{UPenc}$) may be hashed with a number of random numbers to generate a plurality UP encryption keys($K_{UPenc(n)}$). Further, the random numbers may be transmitted to the eNB through a Packet Data Convergence Protocol (PDCP) control message. Using the plurality of UP encryption keys ($K_{UPenc(n)}$), one or more data packets sent may be encrypted by the UE and the encrypted data packets are sent from the UE to the eNB.

In one embodiment, a User Equipment (UE) in a communication network is disclosed. In one example, the UE may include a processor and a memory coupled to the processor. The memory may include a user plane (UP) encryption key ($K_{UPenc}$) generation module that is executed by the processor to derive a UP encryption key ($K_{UPenc}$) from a shared key ($K_{eNB}$) associated with the UE for an ongoing communication session. Further, the $K_{UPenc}$ generation module may hash the UP encryption key ($K_{UPenc}$) with a number of random numbers to generate a plurality of UP encryption keys. The random numbers may be transmitted to the eNB through a Packet Data Convergence Protocol (PDCP) control message. Furthermore, the $K_{UPenc}$ generation module may encrypt one or more data packets sent from the UE to the eNB using the plurality of UP encryption keys.

In one embodiment, a non-transitory computer-readable medium storing computer-executable instructions for secure user plane (U-plane) communication between a User Equipment (UE) and evolved NodeB (eNB) is disclosed. In one example, the stored instructions, when executed by a processor, may cause the processor to perform operations such as deriving, by the UE, a user plane (U-Plane) encryption key ($K_{UPenc}$) from a shared key ($K_{eNB}$) associated with the UE for an ongoing communication session. The operations may further include hashing, by the UE, the UP encryption key ($K_{UPenc}$) with a number of random numbers to generate a plurality UP encryption keys($K_{UPenc(n)}$), wherein the random numbers are transmitted to the eNB through a Packet Data Convergence Protocol (PDCP) control message. The operations may further include encrypting, by the UE, one or more data packets sent from the UE to the eNB using the plurality of UP encryption keys ($K_{UPenc(n)}$).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
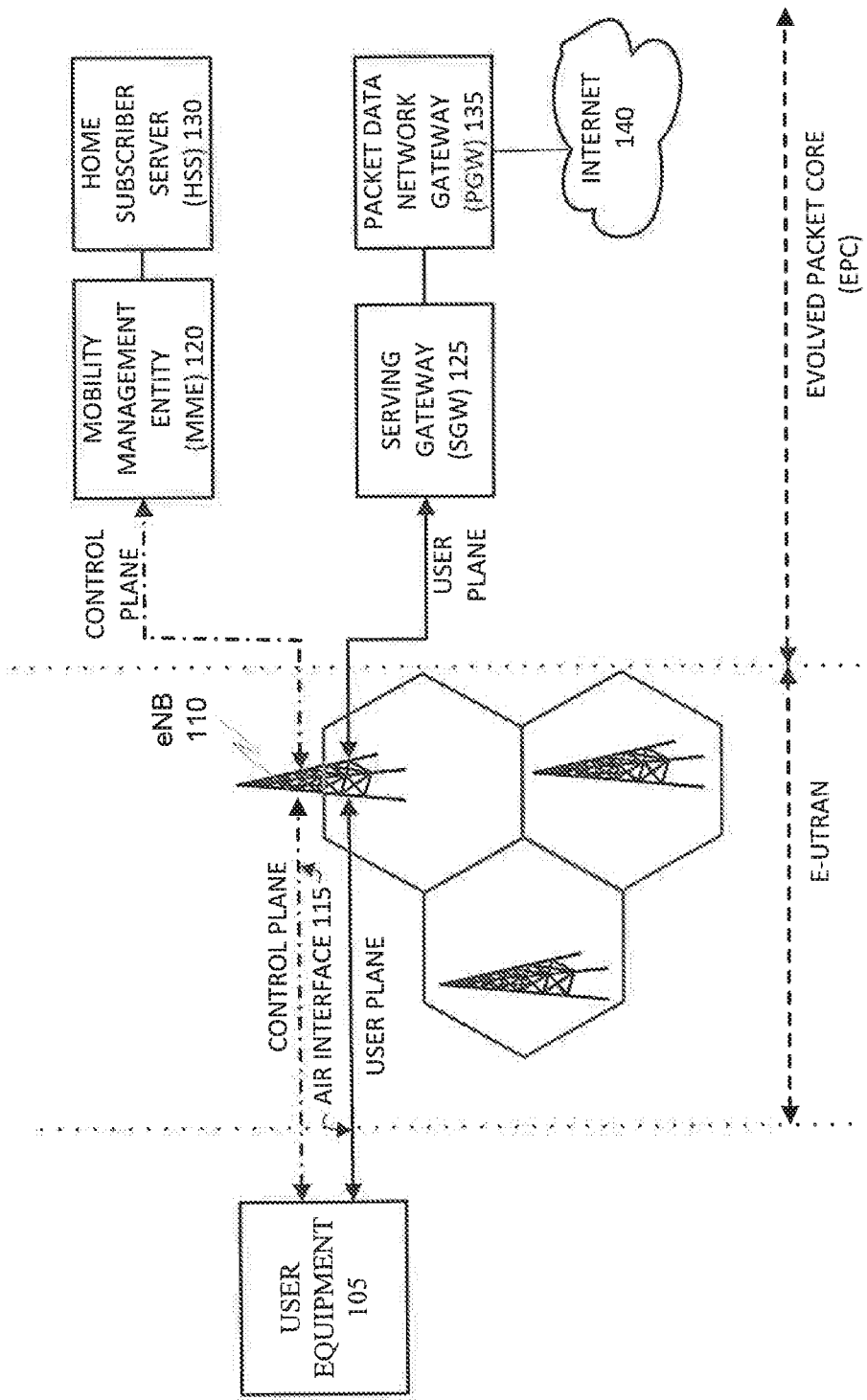
FIG. 1 is an exemplary communication network in which various embodiments of the present disclosure may function.

FIG. 1 is an example communication network 100 in which a User Equipment (UE) 105 of an exemplary embodiment of the present disclosure may function. The communication network 100 may be an Evolved Packet System (EPS) which is the Fourth Generation (4G) of the mobile communication network. Example EPS systems may include Evolved Universal Terrestrial Radio Access Network (EUTRAN) (i.e., evolved NodeBs (eNBs)) and the Internet Protocol (IP)-based Evolved Packet Core (EPC). For instance, EPS is distributed into two separation frameworks: one is User plane (U-plane) framework and another is Control plane (C-plane) framework. The control plane framework is used to carry the signalling traffic (Control plane messages) between the UE 105 and the Mobility Management Entity (MME) 120, whereas the user plane framework carries user data traffic between the UE 105 and the Serving Gateway (S-GW) 125.

As shown in FIG. 1, the user equipment (UE) 105 communicates via an air interface 115 with an evolved Node B (eNB) 110 in the EUTRAN. The eNB 110 is coupled via the MME 120 to a Home Subscriber Server (HSS) 130. Also, the eNB 110 is communicatively coupled via the Serving Gateway (SGW) 125 and Packet Data Network (PDN) Gateway (PGW) 135 with Internet 140. In order to protect the control and user plane communication sent over the air interface 115, Access Stratum (AS) layer and Non-Access Stratum (NAS) layer may be utilized. The NAS security layer is to securely deliver NAS signaling data between the UE 105 and the MME 120 in the control plane using NAS security keys.

The AS security layer is to securely deliver Radio Resource Control (RRC) signaling data sent over air interface 115 between the UE 105 and the eNB 110 in the control plane and IP packets in the user plane. The AS security protocol used at the UE 105 and the eNB 110 may include a protocol stack consisting of a Packet Data Convergence Protocol (PDCP) sublayer, Radio Link Control (RLC) sublayer, Media Access Control (MAC) sublayer, and Physical (PHY) sublayer to perform functions like header compression, ciphering, scheduling, ARQ, and HARQ. Example AS security keys may include RRC integrity key ($K_{RRCint}$), RRC encryption key ($K_{RRCenc}$) and user plane encryption key ($K_{UPenc}$) that are derived from a shared key ($K_{eNB}$). The RRC signaling data are integrity protected using $K_{RRCint}$ and encrypted using $K_{RRCenc}$ at the PDCP layer of the UE 105 before being sent. The IP packets (i.e., user-plane data) are encrypted using $K_{UPenc}$ at the PDCP layer of the UE 105 before being sent.

As described above, the security of the user-plane data is dependent on a single user plane encryption key ($K_{UPenc}$) that is used throughout an entire communication session between the UE 105 and the eNB 110. If this single user plane encryption key ($K_{UPenc}$) is compromised/leaked, then the whole user-plane data security will be on risk and it may allow an intruder to intercept the user-plane data and cause a Man in the Middle (MitM) attack. The term "user plane", "user-plane", "UP", and "U-plane" can be used interchangeably throughout the document.

Various embodiments of the present technique may overcome one or more of the drawbacks of conventional practice by utilizing multiple/different user plane (UP) encryption keys that are derived as a function of random numbers generated at the PDCP layer of the UE 105. Such multiple different UP encryption keys may be dynamically rekeyed for encrypting the data packets transmitted during a communication session between the UE 105 and the eNB 110, thereby achieving secure communication between the UE 105 and the eNB 110 without impacting the performance of the communication network. Further, the UE 105 may allow protected transmissions of the multiple random numbers to the eNB 110, which may improve the resistance to the leak of the U-plane encryption keys or UP encryption keys through malicious attack such as MitM attack. The process of generating and dynamically rekeying the multiple UP encryption keys ($K_{UPenc(1-n)}$) in the UE 105 is explained in detail in conjunction with FIGS. 2-6. Used herein the "$K_{UPenc(1-n)}$" represents "($K_{UPenc(1, 2, 3, 4 \ldots n)}$)" or "($K_{UPenc(1\ to\ n)}$)".

Figure 2:
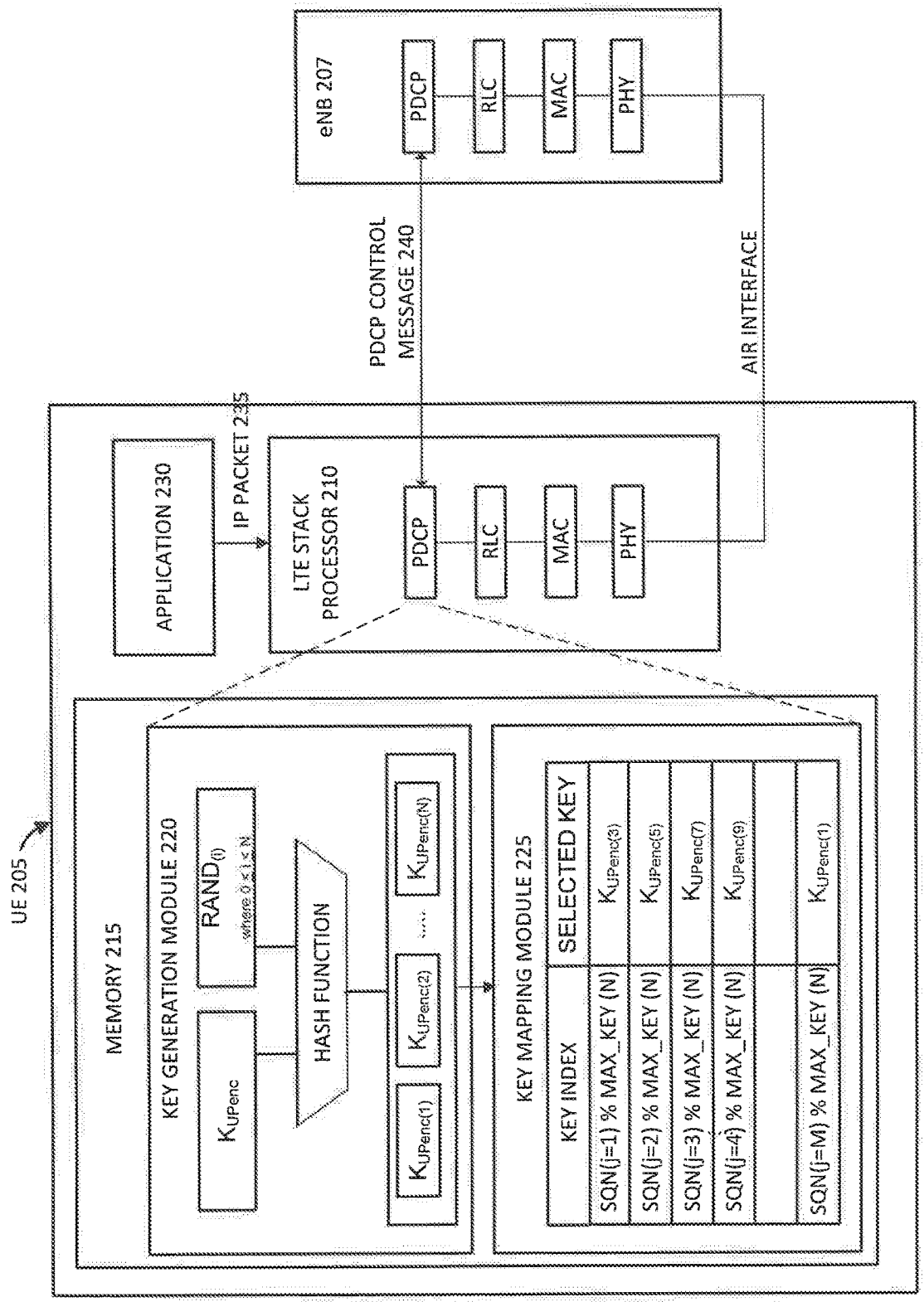
FIG. 2 is a functional block diagram of a UE for securing user plane (U-plane) communication with the evolved NodeB (eNB) in accordance with various embodiments of the present disclosure.

FIG. 2 shows a more detailed view of UE 205 and eNB 207 in an illustrative embodiment. The UE 205 comprises a LTE stack processor 210 coupled to a memory 215. The memory 215 of the UE 205 may include a key generation module 220 and a key mapping module 225 that may be implemented at least in part in the form of software executed by the processor. The LTE stack processor 210 of the UE 205 may comprise, for example, microprocessors, application-specific integrated circuits (ASICs), digital signal processors (DSPs) or other types of processing devices, as well as portions or combinations of such elements.

In operation, the key generation module 220 may derive a UP encryption key ($K_{UPenc}$) from a shared key ($K_{eNB}$) associated with the UE 205. The UP encryption key ($K_{UPenc}$) for one or more data packets may be derived using the shared key ($K_{eNB}$) which is obtained as a result of a successful Authentication and Key Agreement (AKA) process with the MME (as shown in FIG. 1).

Further, the key generation module 220 may hash the UP encryption key ($K_{UPenc}$) with a number of random numbers so as to generate a plurality of UP encryption keys ($K_{UPenc(1-n)}$). For the uplink/downlink data transfer, the UE 205 may process the plurality of UP encryption keys ($K_{UPenc(1-n)}$) to transmit the data packets from the UE 205. Example data packets 235 may be IP packets associated with an application 230 running in the UE 205. The IP packets 235 may be associated with different types of multi-media services, such as voice, video and real-time gaming, and are processed by the application 230 with operating systems such as Android or IOS.

In order to generate a plurality of UP encryption keys ($K_{UPenc(1-n)}$), the random numbers used for hashing may be generated by a pseudo-random generator associated with the UE 205. Example hashing operation may include Secure Hash Algorithm-1 (SHA-1) and a MD5 hashing function as defined as follow:

$$K_{UPenc(i)} = SHA256\ (K_{UPenc}\|RAND(i)),$$

where, 0<=i<=N; and
N<=MAX_NUM_KEY. Used herein, MAX_NUM_KEY is an upper limit/maximum number of random number generated based on the level of security.

For a communication session, the number of random numbers generated in the UE 205 may be automatically controlled based on at least one of a level of security desired, memory utilization and central processing unit (CPU) utilization associated with the UE 205, and bandwidth between the UE 205 and the eNB 207. In one example, the level of security desired for encryption of the U-plane data packets (i.e., IP packets) depends on the configuration setting of the application with which the IP packets are uplink/downlink transferred. In another example, the level of security desired for encryption of the U-plane data packets (i.e., IP packets) may be based on the user requirement. For example, consider 10 random numbers are generated for a communication session, in case of requirement of high security and with more availability of memory utilization and central processing unit (CPU) utilization associated with the UE 205, and more available bandwidth between the UE 205 and the eNB 207, 6-10 number of random numbers may be used for encrypting the data packets transmitted from the UE 205. During requirement of low security and with less available memory utilization and central processing unit (CPU) utilization associated with the UE 205, and less available bandwidth between the UE 205 and the eNB 20, 1-5 number of random numbers may be used for encrypting the data packets transmitted from the UE 205.

Figure 3A:
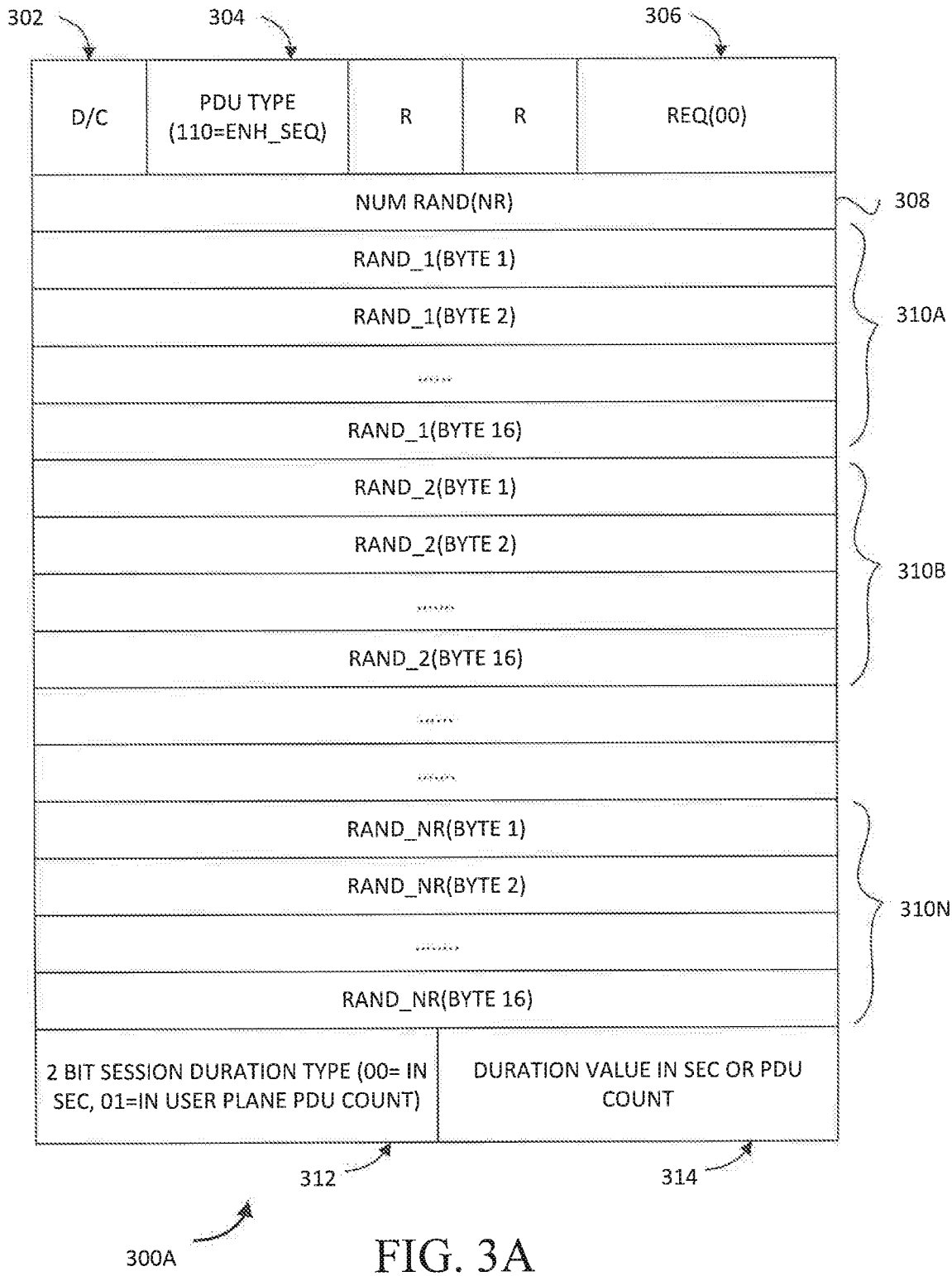
FIGS. 3A-3C illustrate an example protocol message structure of Packet Data Convergence Protocol (PDCP) control messages in accordance with various embodiments of the present disclosure.

Each of the plurality of UP encryption keys ($K_{UPenc(1-n)}$) and the number of random numbers that are used as derivative functions of the plurality of UP encryption keys ($K_{UPenc(1-n)}$) may be stored in a key storage module (not shown in FIG. 2). Further, the information associated with the random numbers may be communicated from the UE 205 to the eNB 207 through a Packet Data Convergence Protocol (PDCP) control message 240. Example PDCP control message 240 sent from the UE 205 to the eNB 207 may include at least one of: the number of random numbers, message type, Protocol Data Unit (PDU) type, a number of packets to be transmitted from the UE to eNB, and initiation/expiry time associated with the ongoing communication session. FIG. 3A illustrates an example protocol message structure of a PDCP control message 300A transmitted from the UE 205 in accordance with various embodiments of the present disclosure. As shown in FIG. 3A, the structure of the PDCP control message 300A transmitted from the UE may include the fields as follow:
  a. D/C 302 indicating the whether the packets sent are associated with the data message or control message. While sending the PDCP control message 300A, the D/C field is set to "0" to indicate the packets sent are associated with control message.
  b. PDU type (3 bits) 304 indicating "EXT_SEC" i.e., extended security provided through UP encryption keys ($K_{UPenc(1-n)}$). This PDU type may be defined in 3 reserve bits of the PDCP control message 300A,
  c. Msg Type (2 bits) 306 indicating EXT_SEC_REC i.e., extended security request, at transmission side UE);
  d. Number of random numbers (4 bits) 308; and
  e. N random numbers 310A-N.

While sending the PDCP control message 240, the direction field is set as "0 or 1" to indicate the uplink transmission or downlink transmission with respect to the eNB. Also, the session detail (duration in sec for sending the PDU packets or number of PDU packets for transmission) 312 and 314 may be included in the PDCP control message 300A transmitted for the UE.

Figure 3B:
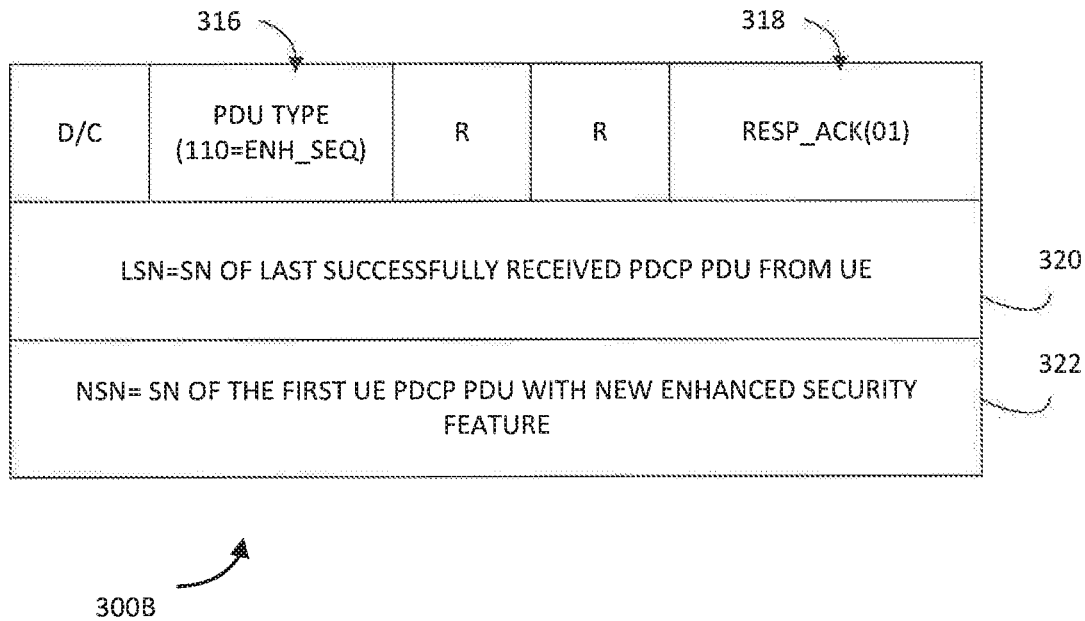
Figure 3C:
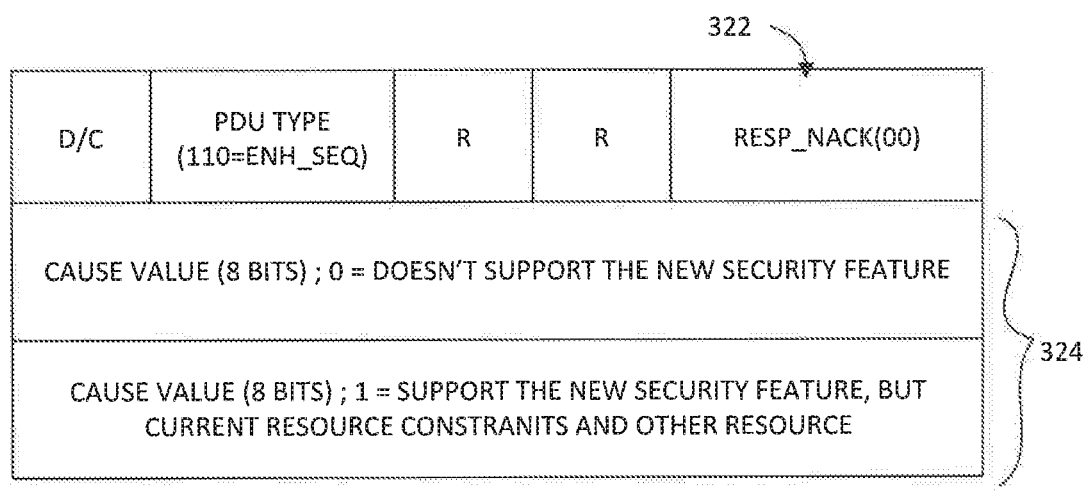

As shown in FIGS. 3B-3C, the structure of the PDCP control message 300B transmitted from the eNB to the UE may include the fields as follow:
  a. PDU type (3 bits) 316 indicating "EXT_SEC" i.e., extended security provided through UP encryption keys ($K_{UPenc(1-n)}$). This PDU type may be defined in 3 reserve bits of the PDCP control message 300B;
  b. Msg Type (2 bits) 318 and 322 indicating at least one of: EXT_SEC_ACK i.e., extended security acknowledgement; and EXT_SEC_NACK i.e., extended security Noacknowledgement, at receiver side eNB);
  c. LSN field 320 indicating the sequence (SN) of last successfully received PDCP Packet Datagram Unit (PDU) packet from the UE;
  d. NSN field 322 indicating the first PDCP PDU packet that need to be communicated from the UE over the new enhanced security feature; and
  e. Cause value (8 bits) 324 indicating whether the eNB support or doesnot support the new enhanced security feature. If the Cause value (8 bits) 324 is set to "0" that indicates eNB supports the new enhanced security feature else if it is "1" that eNB doesnot support the new enhanced security feature.

Used herein the PDCP control messages 300A and 300E may be used in performing peer negotiation between the UE 205 and the eNB 207. For example, using the received random numbers, the plurality of UP decryption keys ($K_{UPenc(1-n)}$) may be generated in the eNB 207 in a similar way as described above. Then, the eNB 207 may send an acknowledgement to the PDCP layer of the UE 205 indicating that all the UP decryption keys ($K_{UPdec(1-n)}$) in the eNB 207 are synchronized with the UP encryption keys ($K_{UPenc(1-n)}$) keys in UE 205.

Upon synchronizing the UP encryption keys ($K_{UPenc(1-n)}$) between the eNB 207 and the UE 205, the key generation module 220 in the UE 205 may encrypt the one or more data packets (i.e., IP packets 235) from the UE 205 to the eNB 207 using the plurality of UP encryption keys. For example, to encrypt a first data packet in the communication session, the key processing module may identify a sequence number assigned to the first data packet to be sent from the UE 205 to the eNB 207. Further, the key mapping module 225 may perform modulo operation of the sequence number ($SEQ_j$) of the data packet and the number of the random numbers, i.e., mod ($SEQ_j$, MAX_KEY), in order to generate a key mapping rule for selecting a UP encryption key among the plurality of UP encryption keys ($K_{UPenc(1-n)}$). For example, the key mapping rule for selecting an UP encryption key for the encryption/authentication is computed as follow:

$$\text{Key map} = SQN_{(j)} \% \text{ MAX\_NUM\_KEY}$$

where, $SQN_{(j)}$ is the sequence number assigned to the data packet;
  1<=j<=M; and
  M is the last sequence number of the U-plane data packet to be communicated between the UE and eNB.

Based on the key mapping rule, the key mapping module 225 may dynamically rekey the plurality of UP encryption keys. In one example, the plurality of UP encryption keys ($K_{UPenc(1-n)}$) may be rekeyed after at least one of a predefined number of packets and a predefined time interval. At the eNB 207 (i.e., receiver side), the encrypted data packet is decrypted at the PDCP layer of the eNB using the sequence number assigned to the data packet.

Figure 4:
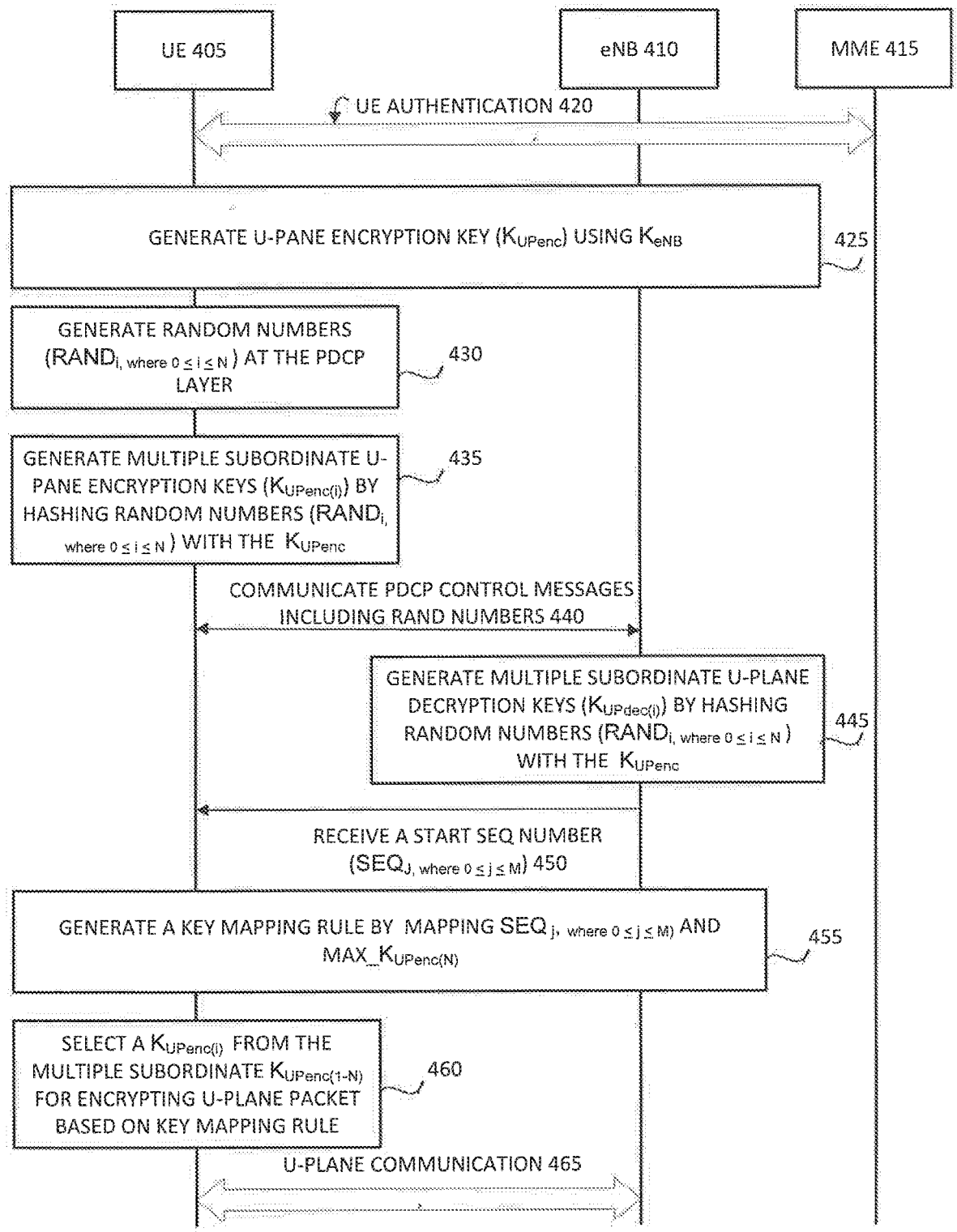
FIG. 4 illustrates an example sequence diagram indicating secure user plane (UP) communication between a User Equipment (UE) and evolved NodeB (eNB) using multiple UP encryption keys($K_{UPenc(n)}$).

FIG. 4 shows a key generation and selection process carried out by UE 405, eNB 410, and MME 415 in an illustrative embodiment. At 420, the UE 405 initially carries out an authentication process with the MME 415. This authentication process illustratively comprises the Authentication and Key Agreement (AKA) process. Upon successful completion of the authentication process, both the UE 405 and MME 415 independently generate a current $K_{eNB}$ key. The $K_{eNB}$ key is subsequently delivered by the MME 415 to the eNB 410, although delivery of the $K_{eNB}$ key is not explicitly shown in the figure.

At 425, using the $K_{eNB}$ key, both the UE 405 and the eNB 410 generate a user-plane encryption key for user-plane data denoted as $K_{UPenc}$, after which the random numbers may be generated at PDCP layer of the UE 405 at 430. Further, at 435, the random numbers may be hashed with the user-plane encryption keys ($k_{UPenc}$) so as to generate multiple subordinate user-plane encryption keys ($K_{UPenc(i)}$). At 440, the PDCP control message including the information associated with the random numbers may be communicated to the eNB 410 for performing peer negotiation between the UE 405 and the eNB 410.

At 445, using the PDCP control message, the eNB 410 may generate multiple subordinate user-plane encryption keys ($K_{UPenc(i)}$). At 450, upon generating the multiple subordinate user-plane encryption keys ($K_{UPenc(i)}$), the eNB 410 may send a positive ACK to the PDCP layer in UE 405 along with the starting sequence number with which UE 405 should encrypt the data packet with the subordinate user-plane encryption keys ($K_{UPenc(i)}$). At 455, in order to generate a key mapping rule for selecting a UP encryption key among the plurality of UP encryption keys ($K_{UPenc(1-n)}$), the PDCP of the UE 405 and eNB 410 may check for the sequence number of the data packet to be sent and then perform modulo operation of the sequence number of the data packet and the number of the random numbers, i.e., mod (SEQ, MAX_KEY). At 460, upon encryption, the UE 405 may enable U-plane communication with the eNB 410 by sending the PDCP Protocol Data Unit (PDU) to the eNB 410. At the Rx side, when the PDCP PDU is received, the PDCP of eNB 410 may check for the sequence number (SQN) of the received packet and determine a subordinate user-plane encryption key to be used for the decryption/authentication.

In one example, the current security session may be based on the predefined number of PDCP PDUs communicated between the UE 405 and eNB 410 or predefined duration defined by a session timer. In one example, an application layer of UE 405 may send an Operation, Administration and Maintenance (OAM) request to the protocol stack (i.e., RRC/PDCP/RLC/MAC/PHY protocol stack layer) to check if the new PDU type feature is supported corresponding to the configuration settings of the UE 405. If not supported the protocol stack may send a not supported OAM response message to the application layer so that the existing AS security mechanism may be established between the UE 405 and the eNB 410. If supported, the protocol stack may send a supported OAM response message to the application layer so that the new AS security mechanism with multiple UP encryption keys may be established between the UE 405 and the eNB 410.

Figure 5:
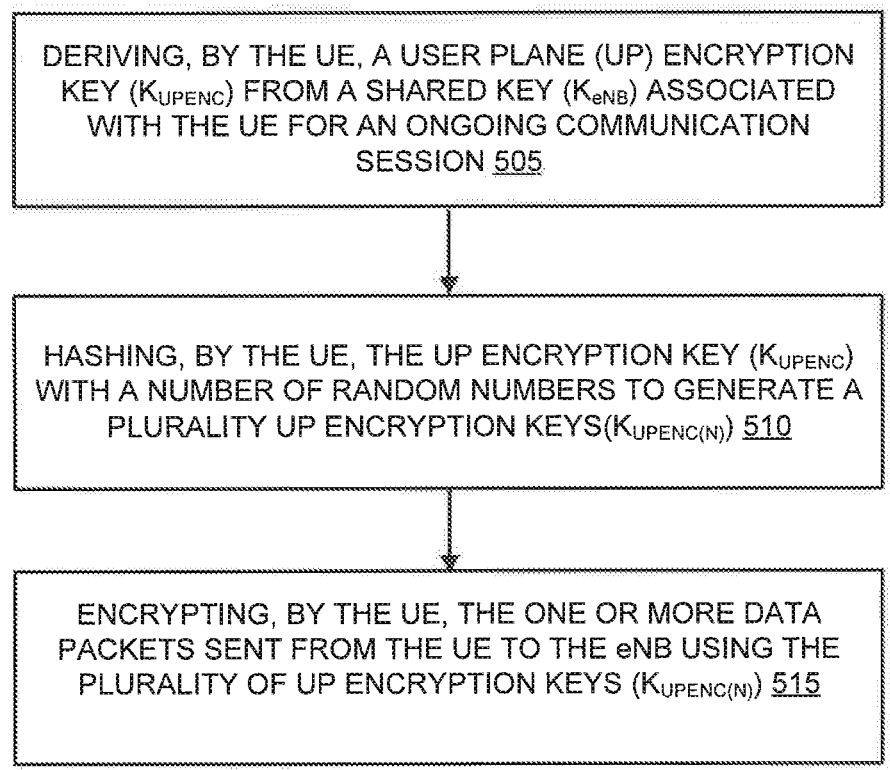
FIG. 5 is a flow diagram illustrating a method of securing UP communication between a User Equipment (UE) and evolved NodeB (eNB) using multiple UP encryption keys ($K_{UPenc(n)}$), in accordance with an exemplary embodiment of the present disclosure.

Referring now to FIG. 5, a flow diagram illustrating a method of securing user-plane (U-plane) communication between a User Equipment (UE) and evolved NodeB (eNB) is described. As illustrated in FIG. 5, at step 505, a user plane (UP) encryption key ($K_{UPenc}$) may be derived, by the UE, from a shared key ($K_{eNB}$) associated with the UE to for an ongoing communication session. At step 510, the UP encryption ($K_{UPenc}$) may be hashed with a number of random numbers to generate a plurality UP encryption keys($K_{UPenc(n)}$). Through a Packet Data Convergence Protocol (PDCP) control message, the number of random numbers are transmitted to the eNB.

The PDCP control message sent from the UE to the eNB may include at least one of: the number of random numbers, message type, Protocol Data Unit (PDU) type, a number of packets to be transmitted from the UE to eNB, and initiation/expiry time associated with the ongoing communication session. The number of random numbers generated in the UE is based on at least one of a level of security desired, memory utilization, central processing unit (CPU) utilization associated with the UE, and the bandwidth between the UE and the eNB. In one example, the UP encryption key ($K_{UPenc}$) may be hashed by at least one of a Secure Hash Algorithm-1 (SHA-1) and a MD5 hashing function.

At step 515, the one or more data packets sent from the UE to the eNB may be encrypted, by the UE, using the plurality of UP encryption keys ($K_{UPenc(n)}$). The UP encryption keys ($K_{UPenc}(n)$) selected from the plurality of UP encryption keys ($K_{UPenc(n)}$) may be based on a key mapping rule. The key mapping rule may be generated based on the sequence number' assigned to a data packet to be sent from the UE to the eNB and the number of random number generated in the PDCP layer of the UE. The key mapping rule generation may involve identifying a sequence number' assigned to a data packet to be sent from the UE to the eNB and selecting a UP encryption key for encrypting the data packet by performing modulo operation of the sequence number by the number of the random numbers. The encrypted data packet is decrypted by the eNB using the sequence number assigned to the data packet. As described above, the security of the user-plane data is improved by utilizing multiple keys throughout an entire communication session between the UE and the eNB.

Figure 6:
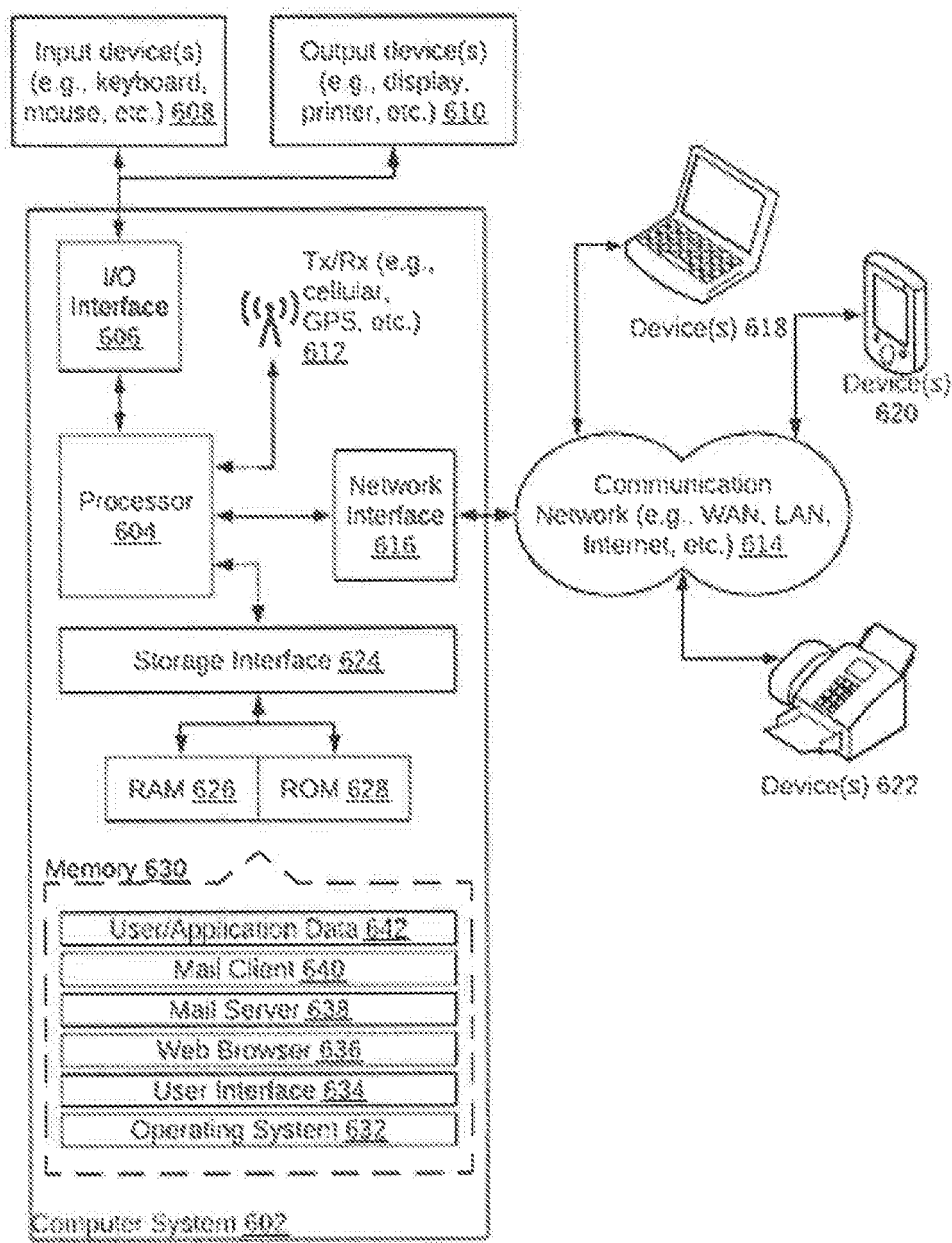
FIG. 6 is a block diagram of an exemplary computer system for implementing embodiments consistent with the present disclosure.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console. NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERU® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for automating testing based on context parsing across multiple technology layers. The method enables efficient handling of context passing across plurality of technology layers, such as Web, Web services, Microservices, Databases, Mainframe, Mobile and Desktop-based thick client applications. Further, the method provides for identification and assimilation of context that is to be passed between different technology layers. Further, the method provides for standardizing and packaging of the context information for use by the different technology layers to thereby allow a seamless end to end execution of the process. Thus, the challenges associated with identification and assimilation of the context passing between different technology layers, and standardizing and packaging of the context information for use by different technology layers is overcome.

The specification has described method and device for automating testing based on context parsing across multiple technology layers. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for secure user plane communication between a User Equipment (UE) and evolved NodeB (eNB), the method comprising:

deriving, by the UE, a user plane (UP) encryption key ($K_{UPenc}$) from a shared key ($K_{eNB}$) associated with the UE for an ongoing communication session;

hashing, by the UE, the UP encryption key ($K_{UPenc}$) with a number of random pen, numbers to generate a plurality UP encryption keys($K_{UPenc(n)}$), wherein the random numbers are transmitted to the eNB through a Packet Data Convergence Protocol (PDCP) control message; and encrypting, by the UE, one or more data packets sent from the UE to the eNB using the plurality of UP encryption keys ($K_{UPenc(n)}$), wherein encrypting the one or more data packets sent from the UE to the eNB using the plurality of UP encryption keys, comprises:

identifying, by the UE, a sequence number assigned to a data packet to be sent from the UE to the eNB; and selecting, by the UE, a UP encryption key for encrypting the data packet by performing modulo operation of the sequence number by the number of the random numbers, wherein the encrypted data packet is decrypted by the eNB using the sequence number assigned to the data packet.

2. The method of claim 1, wherein the number of random numbers is based on at least one of a level of security desired and memory/central processing unit (CPU utilization associated with the UE.

3. The method of claim 1, wherein the number of random numbers is based on a bandwidth between the UE and the eNB.

4. The method of claim 1, wherein the UP encryption key ($K_{UPenc}$) is hashed by at least one of a Secure Hash Algorithm-1 (SHA-1) and a MD5 hashing function.

5. The method of claim 1, wherein the PDCP control message sent from the UE to the eNB comprises at least one of: the number of random numbers, message type, Protocol Data Unit (PDU) type, a number of packets to be transmitted from the UE to eNB, and initiation/expiry time associated with the ongoing communication session.

6. The method of claim 1, wherein the plurality of UP encryption keys are rekeyed after at least one of a predefined number of packets and a predefined time interval.

7. A User Equipment (UE) in a communication network comprising:
   a processor; and
   memory comprising a user plane (UP) encryption key ($K_{UPenc}$) generation module which is executed by the processor to:
   derive a UP encryption key ($K_{UPenc}$) from a shared key ($K_{eNB}$) associated with the UE for an ongoing communication session;
   hash the UP encryption key ($K_{UPenc}$) with a number of random numbers to generate a plurality UP encryption keys, wherein the random numbers are transmitted to the eNB through a Packet Data Convergence Protocol (PDCP) control message; and
   encrypt one or more data packets sent from the UE to the eNB using the plurality of UP encryption keys, wherein encrypting the one or more data packets sent from the UE to the eNB using the plurality of UP encryption keys, comprises:
     identifying, by the UE, a sequence number assigned to a data packet to be sent from the UE to the eNB; and
     selecting, by the UE, a UP encryption key for encrypting the data packet by performing modulo operation of the sequence number by the number of the random numbers, wherein the encrypted data packet is decrypted by the eNB using the sequence number assigned to the data packet.

8. The UE in the communication network of claim 7, wherein the $K_{UPenc}$ module generates the number of random numbers based on at least one of a level of security desired and memory/central processing unit (CPU) utilization associated with the UE.

9. The UE in the communication network of claim 7, wherein the PDCP control message sent from the UE to the eNB comprises at least one of: the number of random numbers, message type, Protocol Data Unit (PDU) type, a number of packets to be transmitted from the UE to eNB, and initiation/expiry time associated with the ongoing communication session.

10. The UE in the communication network of claim 7, wherein the $K_{UPenc}$ module rekeys the plurality of UP encryption keys after at least one of a predefined number of packets and a predefined time interval.

11. A non-transitory computer-readable storage medium having stored thereon, a set of computer-executable instructions causing a User Equipment (UE) comprising one or more processors to:
   derive, by the UE, a user plane (UP) encryption key ($K_{UPenc}$) from a shared key pen, ($K_{eNB}$) associated with the UE to for an ongoing communication session;
   hash, by the UE, the UP encryption key ($K_{UPenc}$) with a number of random pen, numbers to generate a plurality UP encryption keys($K_{UPenc(n)}$), wherein the random numbers are transmitted to the eNB through a Packet Data Convergence Protocol (PDCP) control message; and
   encrypt, by the UE, one or more data packets sent from the UE to the eNB using the plurality of UP encryption keys ($K_{UPenc(n)}$), wherein encrypting the one or more data packets sent from the UE to the eNB using the plurality of UP encryption keys, comprises:
     identifying, by the UE, a sequence number assigned to a data packet to be sent from the UE to the eNB; and
     selecting, by the UE, a UP encryption key for encrypting the data packet by performing modulo operation of the sequence number by the number of the random numbers, wherein the encrypted data packet is decrypted by the eNB using the sequence number assigned to the data packet.

* * * * *